United States Patent [19]

Sekmakas et al.

[11] 4,451,603
[45] May 29, 1984

[54] ABRASION-RESISTANT COATINGS

[75] Inventors: Kazys Sekmakas, Palatine; Ronald L. Richards, Oak Park, both of Ill.

[73] Assignee: DeSoto, Inc., Des Plaines, Ill.

[21] Appl. No.: 387,252

[22] Filed: Jun. 10, 1982

[51] Int. Cl.$^3$ .............................................. C08L 91/06
[52] U.S. Cl. .................................................... 524/279
[58] Field of Search ............................... 524/279, 277

[56] References Cited

U.S. PATENT DOCUMENTS 2,695,277 11/1954 Pabst et al. ........................ 524/277
3,872,040 3/1975 Mollohan et al. ................. 524/279
3,960,983 6/1976 Blank ................................... 525/143

Primary Examiner—Joseph L. Schofer
Assistant Examiner—N. Sarofim
Attorney, Agent, or Firm—Dressler, Goldsmith, Shore, Sutker & Milnamow, Ltd.

[57] ABSTRACT

Coating compositions which cure on baking to provide hard and flexible coatings characterized by superior abrasion resistance and mar resistance comprise:

(1) a polyol component which is an adduct of at least a stoichiometric proportion of ethylene oxide or propylene oxide with a bisphenol;
(2) a solution copolymer containing from 40% to 70% of isobutyl acrylate, 3% to 20% of hydroxy alkyl ester of a monoethylenic carboxylic acid, up to about 20% of monoethylenic carboxylic acid, and any balance consisting essentially of monomer containing a single ethylenic group and no other reactive group; and
(3) aminoplast resin. The polyol constitutes from 20% to 40% of the three named components, the copolymer is present in an amount of from 85% to 150% of the polyol, and the balance of the three named components is the aminoplast resin. Carnauba wax is present in an amount of from 1 to 10 pounds of wax solids per 100 gallons of coating composition.

When the coatings are baked, the carnauba wax blooms to the surface and resists volatilization.

9 Claims, No Drawings

ABRASION-RESISTANT COATINGS

DESCRIPTION

1. Technical Field

This invention relates to coating compositions which cure to provide hard and flexible coatings which are characterized by superior abrasion resistance and mar resistance.

2. Background Art

Solution copolymers containing reactive groups have been used in combination with polyols and aminoplast curing agents to provide curable coating compositions which have been used, both clear and pigmented, to provide coatings for various purposes. In some of these purposes, such as the coating of can exteriors, it is important to provide a flexible cured coating having a combination of hardness and toughness as to provide superior abrasion resistance and mar resistance. This objective has been difficult to achieve.

The solution copolymers under consideration have been employed in organic solvent solution coating compositions and also in aqueous coating compositions, as illustrated especially by U.S. Pat. No. 3,960,983. Both types of coating compositions are contemplated in this invention, and the solution coating compositions may have a very high concentration of nonvolatile solids. Other patents which illustrate the prior art are U.S. Pat. Nos. 3,267,174, 4,052,480 and 4,178,325. The last two of these patents are particularly in point because they use the polyol selection which is made herein, but these do not require a combination of a large amount of isobutyl acrylate and a significant proportion of hydroxy functional monomer, as needed herein. U.S. Pat. Nos. 4,083,892 and 4,144,220 are also of interest, but they use different polyols.

The primary difficulty with the prior art is that abrasion resistance requires a physically tough film having a lubricated surface. Waxes are known to provide surface lubricity, but they must bloom to the surface of the film during baking (become incompatible and stratify). At the same time, the wax which blooms to the surface must have enough affinity for the substance of the film to prevent its removal by volatilization. It is the simultaneous achievement of these seemingly opposite objectives which is the goal of this invention.

DISCLOSURE OF THE INVENTION

In accordance with this invention, it has been found that the desired balance can be achieved by combining a carefully selected solution copolymer with a bisphenol adduct with ethylene oxide or propylene oxide and an aminoplast resin, by using proper proportions of these three components, and by using an appropriate proportion of carnauba wax in the composition.

More particularly, and in this invention, a coating composition comprises:

(1) a polyol component which is an adduct of at least a stoichiometric proportion of ethylene oxide or propylene oxide with a bisphenol;

(2) a solution copolymer containing from 40% to 70% of isobutyl acrylate, 3% to 20% of hydroxy alkyl ester of a monoethylenic carboxylic acid, up to about 20% of monoethylenic carboxylic acid, and any balance consisting essentially of monomer containing a single ethylenic group and no other reactive group; and (3) aminoplast resin, said polyol constituting from 20% to 40% of said components (1), (2) and (3), said copolymer being present in an amount of from 85% to 150% of the polyol, and the balance of said components (1), (2) and (3) being said aminoplast resin, and carnauba wax in an amount of from 1 to 10 pounds of wax solids per 100 gallons of coating composition.

By using materials and proportions in the manner recited, there is enough of an hydroxy functional copolymer rich in isobutyl acrylate to force the carnauba wax in the composition to bloom to the surface.

It further appears that the hydroxy functionality in the copolymer reacts with the aminoplast resin curing agent and forces the wax to separate during the baking operation, and that the isobutyl acrylate in the copolymer provides enough affinity for the wax to prevent it from being lost during the bake despite its presence at the surface of the coating.

All proportions and ratios herein, including the accompanying claims, are by weight, unless otherwise stated.

The carnauba wax should be used in an amount of from 1 to 10 pounds of wax solids per 100 gallons of coating composition. Other lubricants can be added, but these only function well in the presence of the carnauba wax which is forced to bloom and avoid evaporation in the manner described.

Replacement of the isobutyl acrylate has not been possible without sacrificing the combination of properties which is desired. Similarly, and even when the proper proportion of isobutyl acrylate is present in the copolymer, the hydroxy monomer and the carnauba wax component in the composition are essential to the achievement of the combination characteristics desired herein.

It is desired to point out that the compositions of this invention can be used in organic solvent solution coating compositions, in which case the copolymer desirably contains from 1% to 3% of copolymerized carboxylic acid which is preferably acrylic acid or methacrylic acid, though other monoethylenic acids are well known for this purpose. The copolymerized acid provides improved adhesion to a substrate, but this is itself known. These solution coating compositions may have a high solids content of 65% and higher, and it is preferred to use such high solids content when the composition is applied from organic solvent.

The adducts of a bisphenol with ethylene oxide or propylene oxide are themselves known. The ethylene oxide adducts are preferred in aqueous dispersion application while the propylene oxide adducts are preferred when the coatings are applied from organic solvent solution.

The copolymers are made by conventional polymerization in organic solvent solution, and the solvent is preferably water miscible so that the coating composition can be provided in aqueous medium. However, the coating compositions of this invention can be provided in organic solvent solution or in aqueous medium, as desired.

The key to aqueous application is the proportion of monoethylenic carboxylic acid which is employed in producing the copolymer component. A small proportion of carboxylic acid, preferably acrylic acid or methacrylic acid, is desirably included in the copolymer to enhance the adhesion of the coatings. Other monoethylenic acids are well known for this purpose. For water application, one would use at least about 5% of the monoethylenic carboxylic acid in order to provide water dispersibility when the carboxyl groups of the copolymer are at least partially neutralized with a volatile amine, which includes ammonia or other amine, such as dimethyl amino ethanol. Water dispersibility provided in this fashion is itself well known.

The hydroxy alkyl esters are preferably esters of acrylic or methacrylic acid and the alkyl group contains from 2-4 carbon atoms. 2-hydroxy ethyl acrylate is particularly preferred and the other useful hydroxy alkyl esters are themselves well known. It is preferred to use from 5% to 15% of the hydroxy monomer in the copolymer.

The preferred proportion of isobutyl acrylate is 45% to 65%. The preferred aminoplast is hexamethoxy methyl melamine, but other useful aminoplasts are well known and the main variations are solids content and water dispersibility.

By the term a bisphenol is meant a pair of phenolic groups interconnected through an intervening divalent group which may be a straight chain or branched chain aliphatic radical of 1 to 3 carbon atoms, or

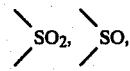

or —O—.

The preferred bisphenol is bisphenol A in which the two phenolic groups are connected by 2—2 propylidene, and the hydroxy groups of the two phenolic radicals are in the para position.

Other bisphenols which can be used are illustrated by 4,4'-thiodiphenol and 4,4'-sulfonyl diphenol. Tetra-substitutable bisphenols are preferred.

The invention is illustrated in the examples which follow.

EXAMPLE 1

430 parts of styrene, 160 parts of 2-hydroxyethyl acrylate, 850 parts of isobutyl acrylate, 145 parts of acrylic acid and 55 parts of t-butyl perbenzoate are premixed and added over a 3½ hour period to 885 parts of 2-butoxy ethanol which is preheated to 120° C. A reaction temperature of 120°-125° C. is maintained during the addition of the monomer mixture and for one hour thereafter.

Then, and to insure completion of polymerization, 5 parts of t-butyl perbenzoate are added and the reaction temperature is maintained for ½ hour. This sequence is then repeated with another 5 parts of the same catalyst. The product is then cooled to 70° C. and a solution of 180 parts of dimethyl ethanol amine in 150 parts of deionized water are added with stirring over a 20-minute period. 1200 parts of additional deionized water are then added with stirring over a 30-minute period and the product is then cooled to room temperature to provide an aqueous dispersion having a solids content of 40.3%, a Gardner viscosity of Y, and an acid value for the nonvolatile material of 69.6.

The copolymer produced above contains 10.1% of 2-hydroxyethyl acrylate and 9.2% of acrylic acid.

EXAMPLE 2

Charge the following into a large tank: 154 pounds of hexamethoxymethyl melamine, 14 pounds of butanol, 13 pounds of tridecyl alcohol, 3 pounds of a commercial defoamer (Foamaster TCX made by Diamond Shamrock) and 14 pounds of carnauba wax emulsion [25% solids aqueous emulsion] (Michem #15625 from Michelman Chemical Company). This material is permixed under shear to provide a uniform dispersion of these ingredients.

Then add, under low speed agitation, the following:

| Component | Pounds |
|---|---|
| Acrylic solution of Example 1 | 268 |
| Polyol (Synfac 8008 from Milliken Chemical Company) [bisphenol A adducted with 6 mols of ethylene oxide per mol of bisphenol] | 112 |
| Silicone Oil (Masil 1066-D from Masil Chemical Company) | 0.95 |

In a separate tank premix the following under low speed agitation:

| Component | Pounds |
|---|---|
| Nacure 155 (King Industries) [sulfonic acid catalyst] | 2.1 |
| dimethyl ethanol amine | 0.37 |

This premixture is stirred into the large tank.

Deionized water is then added to adjust viscosity (50 seconds in a #4 Ford Cup).

The usual final solids content is about 45%.

The above coating composition provides a clear aqueous coating which is applied over the exterior of aluminum can stock by roll coat to apply a coating weighing 80-150 milligrams of solid material per 12-ounce can. The coated cans are baked by passing them through an oven maintained at 550° F. in a period of 8 seconds.

The resulting coated cans are hard and flexible. However, the production machinery for producing the coated cans is fast moving, and unless the baked coatings are hard and flexible and include a highly lubricated surface, they will be marred and damaged by the production handling equipment. This action becomes more severe as the production line speed increases. The coating compositions of this invention perform excellently.

What is claimed is:

1. A coating composition selected from solvent solution coating compositions and aqueous coating compositions comprising:
   (1) a polyol component which is an adduct of at least a stoichiometric proportion of ethylene oxide or propylene oxide with a bisphenol;
   (2) a solution copolymer containing from 40% to 70% of isobutyl acrylate with 3% to 20% of hydroxy alkyl ester of a monoethylenic carboxylic acid, up to about 20% of monoethylenic carboxylic acid, and any balance consisting essentially of monomer containing a single ethylenic group and no other reactive group; and
   (3) aminoplast resin, said polyol constituting from 20% to 40% of said components (1), (2) and (3), said copolymer being present in an amount of from 85% to 150% of the polyol, and the balance of said components (1), (2) and (3) being said aminoplast resin, and carnauba wax in an amount of from 1 to 10 pounds of wax solids per 100 gallons of coating composition.

2. A coating composition as recited in claim 1 in which said composition is a solution in volatile organic solvent containing at least about 65% of said components (1), (2) and (3) and containing from 1% to 3% of said carboxylic acid in said copolymer.

3. A coating composition as recited in claim 2 in which said polyol is an adduct of propylene oxide with a bisphenol.

4. A coating composition as recited in claim 1 in which said composition is an aqueous dispersion containing at least 5% of said carboxylic acid in said copolymer and at least a portion of said acid is neutralized with a volatile amine to provide water dispersibility for said copolymer.

5. A coating composition as recited in claim 4 in which said polyol is an adduct of ethylene oxide with a bisphenol.

6. A coating composition as recited in claim 1 in which said hydroxy alkyl ester is an ester of acrylic or methacrylic acid and said alkyl group contains from 2-4 carbon atoms.

7. A coating composition as recited in claim 1 in which said copolymer contains from 5% to 15% of 2-hydroxy ethyl acrylate.

8. A coating composition as recited in claim 1 in which said copolymer contains from 45% to 65% of isobutyl acrylate.

9. A coating composition as recited in claim 1 in which said aminoplast resin is hexamethoxy methyl melamine.

* * * * *